(12) United States Patent
Walter et al.

(10) Patent No.: US 9,510,607 B2
(45) Date of Patent: Dec. 6, 2016

(54) ISOMALTULOSE IN FONDANTS

(75) Inventors: Thomas Walter, Mühlhausen (DE);
Stephan Marhöfer, Gundheim (DE);
Tillmann Dörr, Hohen-Sülzen (DE)

(73) Assignee: Südzucker Aktiengesellschaft Mannheim/Ochsenfurt, Mannheim, DE (US)

( * ) Notice: Subject to any disclaimer, the term of this patent is extended or adjusted under 35 U.S.C. 154(b) by 286 days.

(21) Appl. No.: 13/996,196

(22) PCT Filed: Dec. 15, 2011

(86) PCT No.: PCT/EP2011/006325
§ 371 (c)(1),
(2), (4) Date: Jun. 20, 2013

(87) PCT Pub. No.: WO2012/084148
PCT Pub. Date: Jun. 28, 2012

(65) Prior Publication Data
US 2013/0309370 A1 Nov. 21, 2013

(30) Foreign Application Priority Data
Dec. 21, 2010 (DE) .................. 10 2010 055 577

(51) Int. Cl.
A23G 3/00 (2006.01)
A23G 3/42 (2006.01)
A23G 3/34 (2006.01)
A23G 3/48 (2006.01)

(52) U.S. Cl.
CPC ............... *A23G 3/42* (2013.01); *A23G 3/343* (2013.01); *A23G 3/48* (2013.01)

(58) Field of Classification Search
CPC ........... A23G 3/343; A23G 3/42; A23G 3/48
USPC ...................................... 426/103, 659, 556
See application file for complete search history.

(56) References Cited

U.S. PATENT DOCUMENTS

2009/0202698 A1   8/2009   Krohn et al.

FOREIGN PATENT DOCUMENTS

| JP | H01-191646 A | 1/1989 |
| JP | 8-089175 A | 4/1996 |
| JP | H08-89175 A | 9/1996 |
| JP | 2002-262776 A | 9/2002 |
| JP | 2006-519006 A | 8/2006 |
| JP | 2006-306831 A | 11/2006 |
| JP | 2010-528632 A | 8/2010 |
| WO | WO 2008071797 A1 * | 6/2008 |
| WO | 2009/133835 | 11/2009 |
| WO | WO 2009154887 A1 * | 12/2009 |

OTHER PUBLICATIONS www.caloriecontrol.org, Isomalt, low calorie sweetener, Oct. 14, 1997, date verified by webarchive.org. 4 pages.*
International Preliminary Report on Patentability, Jun. 25, 2013 from related PCT Application No. PCT/EP2011/006325.
Compound Food Additives, 1st ed., Hu Guohua, Chemical Industry Press, Jun. 2006, p. 206.
Office Action from related Japanese patent application No. 2013-545085, dated Sep. 30, 2014.

* cited by examiner

*Primary Examiner* — Jyoti Chawla
(74) *Attorney, Agent, or Firm* — Christopher L. Wight; Snow Christensen & Martineau

(57) ABSTRACT

The present invention concerns a fondant containing at least one sweetness enhancer, isomaltulose, preferably isomaltulose and trehalose, in the form of a crystalline phase and glucose in the form of a non-crystalline phase, a method for preparing same, the use of the fondant as a coating for baked goods and baked goods that are coated completely or partly with the fondant according to the invention.

17 Claims, 2 Drawing Sheets

ISOMALTULOSE IN FONDANTS

FIELD OF INVENTION

Figure 1:
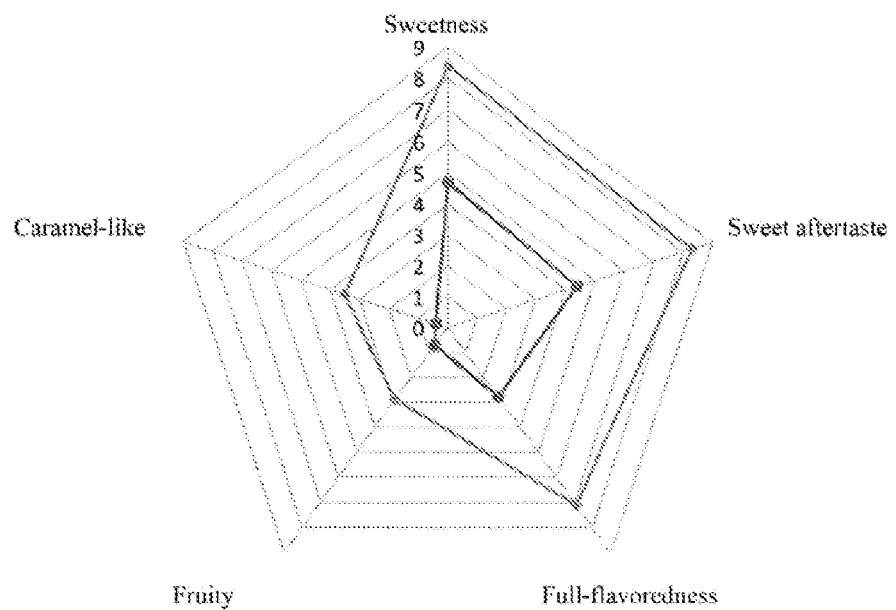

The present invention concerns a fondant containing at least one sweetness enhancer, isomaltulose, preferably isomaltulose and trehalose, in the form of a crystalline phase and glucose in the form of a non-crystalline phase, a method for preparing same, the use of the fondant as a coating for baked goods and baked goods that are coated completely or partly with the fondant according to the invention.

BACKGROUND

Fondants are soft, paste-like sugar masses that are used either by themselves for producing various confectionery items or as a filling or a glaze for food products and semi-luxury foods. To prepare a fondant, sucrose, glucose syrup, invert sugar cream and/or sugar alcohols and water, for example are used. The mass is cooked and then processed through vigorous kneading and rapid cooling to form a soft paste. Flavors or food coloring can then be added. Fondant is usually prepared through supersaturation of a sucrose solution. An excessive quantity of sucrose is dissolved in hot water, causing the sugar to remain dissolved when the solution cools, thereby forming a supersaturated solution. If seed crystals are added to a supersaturated solution, the dissolved sucrose crystallizes out. If the solution is not stirred, the sucrose forms large crystals that create a crunchy, rough texture of the fondant. However, if the solution is vigorously stirred or kneaded during crystallization, fine crystals form that create a smooth texture of the fondant.

It is generally acknowledged that the sweetness of food elements plays a very important role in the palatability of food products. Food products or semi-luxury foods that have a high sugar content, i.e., a high sucrose content in particular, are therefore especially preferred by consumers due to the high sweetening power thereof. Sucrose, however, is high-glycemic. A high content of high-glycemic carbohydrates is known to lead to a rapid rise in blood sugar levels. This can lead to health problems, such as obesity, insulin resistance or diabetes. Attempts are therefore increasingly being made to reduce the sucrose content in food products or semi-luxury foods. On the one hand, this can be accomplished by means of sugar substitutes. However, many sugar substitutes do not have the sweetening power of sucrose, for example. Therefore, intensive sweeteners are often used in addition when needed. With intensive sweeteners, the problem exists that many are not thermally stable or have a different flavor profile than sucrose, such as a bitter or astringent aftertaste.

Fondant is often used for glazing baked goods or deep-fried pastries, such as doughnuts. If a sucrose-based fondant is used in this case, the storage stability or shelf life of the pastries is very limited, since sucrose acts hygroscopically and the glaze therefore becomes sticky during storage. Besides fondants made of sucrose, fondants made of trehalose are also known in the prior art. Because of a high water content, however, trehalose as a solid tends to clump and is therefore disadvantageous in processing. Furthermore, trehalose crystallizes very coarsely in fondant, thereby causing a disadvantageously rough texture of the glaze.

SUMMARY OF INVENTION

Therefore, the present invention seeks to address the problem in particular of overcoming the aforementioned disadvantages, in particular providing a sucrose-free or sucrose-reduced fondant that has a sweetness equal to that of a conventional sucrose fondant and that has a high storage stability and low hygroscopicity and that is particularly well suited to be used as a glossy, transparent food coating or also as a filling.

The technical problem is solved by the subject matters of the independent claims, in particular by a fondant containing 0.1 to 1.0% by weight of at least one sweetness enhancer (total weight of sweetness enhancer based on the dry substance (DS) of the fondant) and a sugar system made up of a crystalline phase and a non-crystalline phase, wherein the fondant comprises 65 to 95% by weight of at least one sugar (total weight of sugar in the crystalline phase based on the DS of the fondant) in the form of a crystalline phase and 4 to 34% by weight of glucose syrup in the form of a non-crystalline phase (total weight of glucose syrup in the non-crystalline phase based on the DS of the fondant) and wherein the at least one sugar in the crystalline phase is isomaltulose. In a preferred embodiment, the at least one sugar present in the crystalline phase is isomaltulose, and trehalose is present as an additional sugar.

According to the invention, it is therefore provided that the fondant comprises a two-phase sugar system, one phase being a crystalline phase and another phase being a non-crystalline phase. According to the invention, it is provided that the crystalline phase is formed of isomaltulose, i.e., that isomaltulose is present in crystalline form in the fondant. According to the invention it is also provided that the non-crystalline phase comprises glucose syrup. In an especially preferred embodiment, it is therefore provided that the fondant comprises a crystalline phase containing, in particular consisting of, isomaltulose and a non-crystalline phase containing, in particular consisting of, glucose syrup. In a further preferred embodiment it is provided that the fondant according to the invention comprises a crystalline phase containing, in particular consisting of, isomaltulose and trehalose and a non-crystalline phase containing, in particular consisting of, glucose syrup. In this especially preferred embodiment, according to which the crystalline phase is formed of isomaltulose and trehalose, preference is given according to the invention to the use of 40 to 99% by weight, in particular 60 to 95% by weight, in particular 70 to 80% by weight, in particular 50 to 90% by weight, in particular 50 to 80% by weight, in particular 50 to 70% by weight and more particularly 55 to 65% by weight, of isomaltulose and preferably 60 to 1% by weight, in particular 40 to 5% by weight, in particular 30 to 20% by weight, in particular 50 to 10% by weight, in particular 50 to 20% by weight, in particular 50 to 30% by weight and in particular 45 to 35% by weight, of trehalose (in each case total weight of the isomaltulose or trehalose based on the total weight of the crystalline phase). In a further preferred embodiment it is provided that the fondant according to the invention comprises a crystalline phase containing, in particular consisting of, isomaltulose, trehalose and sucrose and a non-crystalline phase containing, in particular consisting of, glucose syrup.

In an especially preferred embodiment of the present invention, the fondant comprises 0.1 to 1.0% by weight of at least one sweetness enhancer (total weight of sweetness enhancer based on dry substance of the fondant) and a sugar system made up of a crystalline phase and a non-crystalline phase, wherein the fondant comprises 80 to 89% by weight, in particular 81 to 88% by weight, preferably 84% by weight, of sugar, in particular isomaltulose or a mixture of isomaltulose and trehalose or a mixture of isomaltulose and trehalose and sucrose (total weight of isomaltulose and optionally trehalose and optionally sucrose, based on the dry substance of the fondant) in the form of a crystalline phase and 10 to 19% by weight, preferably 11 to 18% by weight, preferably 16% by weight, of glucose syrup in the form of a non-crystalline phase (total weight of glucose syrup based on the dry substance of the fondant).

DETAILED DESCRIPTION

In the context of the present invention, unless otherwise stated and/or obvious, the percentages of each component specified for a composition of components add up to 100%, i.e., to the total composition.

In the context of the present invention, a "sugar system" means a mixture of at least two different sugars. In the context of the present invention, a "sugar system made up of a crystalline phase and a non-crystalline phase" means a mixture of at least two sugars, one of the sugars being present in crystalline form and at least one other sugar being present in non-crystalline form, in particular as a syrup.

It is especially preferable if the glucose syrup comprises a solids content of 60 to 90% by weight, in particular 65 to 85% by weight, in particular 70 to 85% by weight, preferably 74 to 80% by weight (DS based on the total weight of the glucose syrup).

In a preferred embodiment the fondant comprises isomaltulose and glucose syrup as the only sugars. In a preferred embodiment the fondant comprises isomaltulose, trehalose and glucose syrup as the only sugars. In a preferred embodiment, the fondant is free of sucrose. In a preferred embodiment, the fondant may also contain, in addition to isomaltulose or in addition to trehalose and isomaltulose, sucrose in the crystalline phase. In one embodiment, the fondant may contain, in addition to the aforementioned sugars, namely isomaltulose, trehalose and glucose syrup, other sugars, for example trehalulose.

In a preferred embodiment of the present invention, the fondant comprises no sugar substitutes, in particular no sugar alcohols and/or no intense sweeteners.

Surprisingly, it has been found that the fondant according to the invention in a preferred embodiment results in a particularly smooth, glossy and transparent glaze having fine crystals, on food products, for example on baked goods, in particular on deep-fried pastries. Even when the fondants are used at 40 to 50° C. on, for example, hot deep-fried pastries, rapid drying of the glaze on the pastries is ensured. Furthermore, the storage stability of the fondant according to the invention is noticeably increased, and the hygroscopicity is low. Advantageously, a coating made of fondant according to the invention draws little to no water from the interior of the coated product and from the ambient air. When used as a coating, for example as a glaze, i.e., as a transparent coating, the stickiness that develops is especially low. The fondant according to the invention advantageously has a flavor profile and above all a sweetening power equal to that of a sucrose-containing, in particular a conventional sucrose-containing, fondant.

Isomaltulose is a low-glycemic sucrose isomer that is also known under the name Palatinose™. Isomaltulose is usually produced enzymatically by fermentation and is acariogenic. In a preferred embodiment, isomaltulose is used in the form of crystalline isomaltulose which, in the preferred form, may be present in powdered form. Particular preference is given to the use of Palatinose™ PST-N, i.e., isomaltulose having a crystal particle size of 90%<0.7 mm or Palatinose™ PST-PA, i.e., isomaltulose having a crystal particle size of 90<0.05 mm. In an especially preferred embodiment, Palatinose™ PST-PF, i.e., isomaltulose having a crystal particle size of 90%<0.1 mm or Palatinose™ PAP-N, i.e., isomaltulose having a crystal particle size of 90%<0.7 mm, may be used. In a preferred manner, the isomaltulose in the crystalline phase has a crystal particle size of 1 to 100 µm, in particular 10 to 90 µm, 20-80 µm, 30-80 µm, 40-80 µm, in particular 50 to 80 µm, particularly preferably 10 to 60 µm, in particular 20 to 60 µm, in particular 30 to 60 µm, preferably 10 to 50 µm, in particular 20 to 50 µm. The fondant according to the invention preferably has a crystal particle size of isomaltulose in the crystalline phase of 90%<70 µm, in particular of 90%<50 µm, particularly preferably of 90%<40 µm. The use of isomaltulose of these particle sizes, in particular of 90%<50 µm, in a preferred embodiment results in a smooth and glossy fondant having fine crystals. Advantageously, isomaltulose as a solid having these crystal particle sizes has a reduced tendency to clump, since the water content in one embodiment is only approximately 5%. This allows for better processability as compared to the use of trehalose alone in a fondant, which may have a water content of 10%.

Glucose syrup is preferably made from starch and contains, in addition to glucose, mainly di-, tri- and oligomers. In the context of the present invention, glucose syrup is understood to mean in particular a solution obtained preferably from starch by hydrolysis, for example by enzymatic cleavage and comprising mainly glucose but also high molecular weight starch fragments. In an especially preferred embodiment, glucose syrup is present in the form of an aqueous solution. In an especially preferred embodiment, glucose syrup has a dry substance content of 75 to 85% by weight, in particular 80 to 85% by weight, in particular 83 to 84% by weight. In an especially preferred embodiment, glucose syrup has a DE (dextrose equivalent) value of 35 to 45, in particular 38 to 42, preferably 40 (DE).

The present invention uses, in addition to isomaltulose and glucose syrup, a sweetness enhancer. In the context of the present invention, a sweetness enhancer is understood to mean a substance which, in contrast to intense sweeteners, by itself has no or virtually no sweet flavor, i.e., no or very low inherent sweetness, but which is capable of enhancing the sweetness of another sweet substance.

In the context of the present invention, a sweetness enhancer is in particular a substance that enhances the sweet taste of a 5% sucrose solution by 10 to 30%, in particular up to a maximum sweetness of a 6.5% sugar solution.

Where applicable, the sweetness enhancer used also has an effect on the overall flavor profile of the product, i.e., it improves, for example, the mouthfeel. Sweetness enhancers are usually used in low doses and synergistically enhance the sweetening power of another sweetener present. In the context of the present invention, a sweetness enhancer is not an intense sweetener. In the fondant according to the invention, in particular all known sweetness enhancers may be used in an embodiment.

In a preferred embodiment of the present invention, the sweetness enhancer is a plant extract. However, it is also possible, of course, to use synthetic or artificial sweetness enhancers.

In an especially preferred embodiment, the fondant according to the invention contains 5 to 50% by weight, preferably 7 to 40% by weight, particularly preferably 20 to 40, preferably 20 to 30% by weight, in particular 25 to 30% by weight, in particular 10 to 35% by weight, of water (based on the total weight of the fondant), in particular in the non-crystalline phase.

However, the invention also concerns a fondant having significantly lower water content, in particular fondants that are present in finished form, for example applied as a coating on a product. In an especially preferred embodiment, the fondant according to the invention has a dry substance content of 60 to 93% by weight, preferably 65 to 90% by weight, in particular 65 to 85% by weight, in particular 70 to 90% by weight, in particular 70 to 80% by weight, the percentage to be added to bring the total up to 100% by weight (based on the total weight of the fondant) being water.

In one embodiment of the present invention, the fondant contains 0.01 to 0.3% by weight, preferably 0.01 to 0.1% by weight, in particular 0.01 to 0.8% by weight (total weight of thickener based on the dry substance of the fondant) of one or more thickeners selected from the group consisting of agar, carrageenan and xanthan gum. The use of at least one thickener is especially advantageous, in particular for the use of the fondant as a coating fondant. Advantageously, the recrystallization of components of the sugar system is prevented and the flexibility and stability of the coating is ensured, even for longer periods of time.

Preferably, the fondant according to the invention contains 0.01 to 3% by weight, preferably 0.01 to 1% by weight, in particular 0.01 to 0.8% by weight (total weight of acid, based on the dry substance of the fondant) of a food-grade organic acid, a flavor or both. It is especially preferable if the food-grade organic acid is citric acid or lactobionic acid. In an especially preferred embodiment, the present invention concerns a fondant that comprises, in addition to the at least one sweetness enhancer, at least one acid, in particular a food-grade acid, preferably citric acid or lactobionic acid. Such products are characterized by a particularly balanced flavor profile.

It may also be provided that the fondant according to the invention contains food coloring.

The invention also has as its subject matter a method for producing a fondant, in particular the fondant according to the invention, according to which in a method step (a) crystalline isomaltulose is mixed with a non-crystalline phase containing or consisting of glucose syrup and water, in a method step (b) isomaltulose seed crystals are added to the mixture obtained in method step (a) and in a method step (c) at least one sweetness enhancer is added to the mixture obtained in method step (b), whereby a fondant is obtained.

In particular, crystalline isomaltulose and crystalline trehalose are mixed in the method according to the invention in method step (a) with a non-crystalline phase containing or consisting of glucose syrup and water, in a method step (b) isomaltulose seed crystals are added and in a method step (c) at least one sweetness enhancer is added to the mixture obtained in method step (b), whereby a fondant is obtained.

In an especially preferred embodiment it may be provided that at least one thickener is incorporated in the non-crystalline phase containing glucose syrup and water used in method step (a). In this preferred embodiment, the fondant obtained can be used preferably as a coating fondant.

In a further preferred embodiment it may be provided that incorporating the crystalline sugar components that form the crystalline phase, i.e., in particular isomaltulose or isomaltulose and trehalose, takes place in a heated non-crystalline phase, in particular a non-crystalline phase having a temperature of 70 to 98° C., in particular 80 to 96° C.

In an especially preferred embodiment it can be provided that the isomaltulose or isomaltulose and trehalose, incorporated in method step (a) is completely dissolved in method step (a) in the non-crystalline phase, in particular in a heated mixture, preferably at temperatures of 80 to 98° C., in particular 85 to 95° C.

In an especially preferred embodiment it can be provided that upon dissolving the crystalline sugars in the non-crystalline phase, the temperature is lowered, preferably to temperatures of 40 to 70° C., in particular 45 to 60° C., in particular 50° C. In an especially preferred embodiment it can be provided that the crystallization is carried out after lowering the temperature, by adding isomaltulose seed crystals according to method step (b).

Following or during the addition of the seed crystals, the at least one sweetness enhancer is added in method step (c). The suspension in the preferred embodiment may then be stirred. Preferably, the suspension formed after crystallization is allowed to mature for 8 to 10 hours, in particular 10 to 12 hours, during which time a post-crystallization takes place.

Another subject matter of the present invention concerns the use of the fondant according to the invention as a coating fondant for food products and semi-luxury foods, in particular for baked goods. It is especially preferable, in particular for glazing, if the fondant is used in semisolid or liquid form having a water content of 7 to 40% by weight, in particular 10 to 30% by weight, preferably 20 to 30% by weight. In a preferred embodiment the fondant according to the invention is present as a finished, dried coating having a water content of 0.1 to 1% by weight, in particular 0.3 to 0.5% by weight.

In an especially preferred embodiment of the present invention, the fondant according to the invention is used for glazing baked goods, in particular deep-fried pastries, cakes, tortes, cookies, waffles, confectionery products, patisserie products or the like.

The invention also has as its subject matter a food product and semi-luxury food, in particular a baked good that is coated completely or partly with the fondant according to the invention, the fondant according to the invention preferably being transparent. In an especially preferred embodiment of the present invention, trehalose-containing fondants of the present invention are suited for making products that are coated with a fondant according to the invention, the fondant coating advantageously being present in transparent form, i.e., as a glaze.

The present invention also concerns the use of the fondant according to the invention as a filling, in particular of food products and semi-luxury foods, in particular of sweets, in particular candy, such as confections or confectionery products. In an especially preferred embodiment, the fondant of the present invention can therefore be used as a filling, for example for chocolate products, confectionery products, patisserie products, filled chocolates, confections or the like.

The invention also has as its subject matter a food product or semi-luxury food, in particular a sweet that contains a fondant according to the present invention.

The present invention therefore also concerns products, in particular food products and semi-luxury food items, containing a fondant according to the present invention.

Further advantageous embodiments of the invention are specified in the subclaims.

Figure 2:
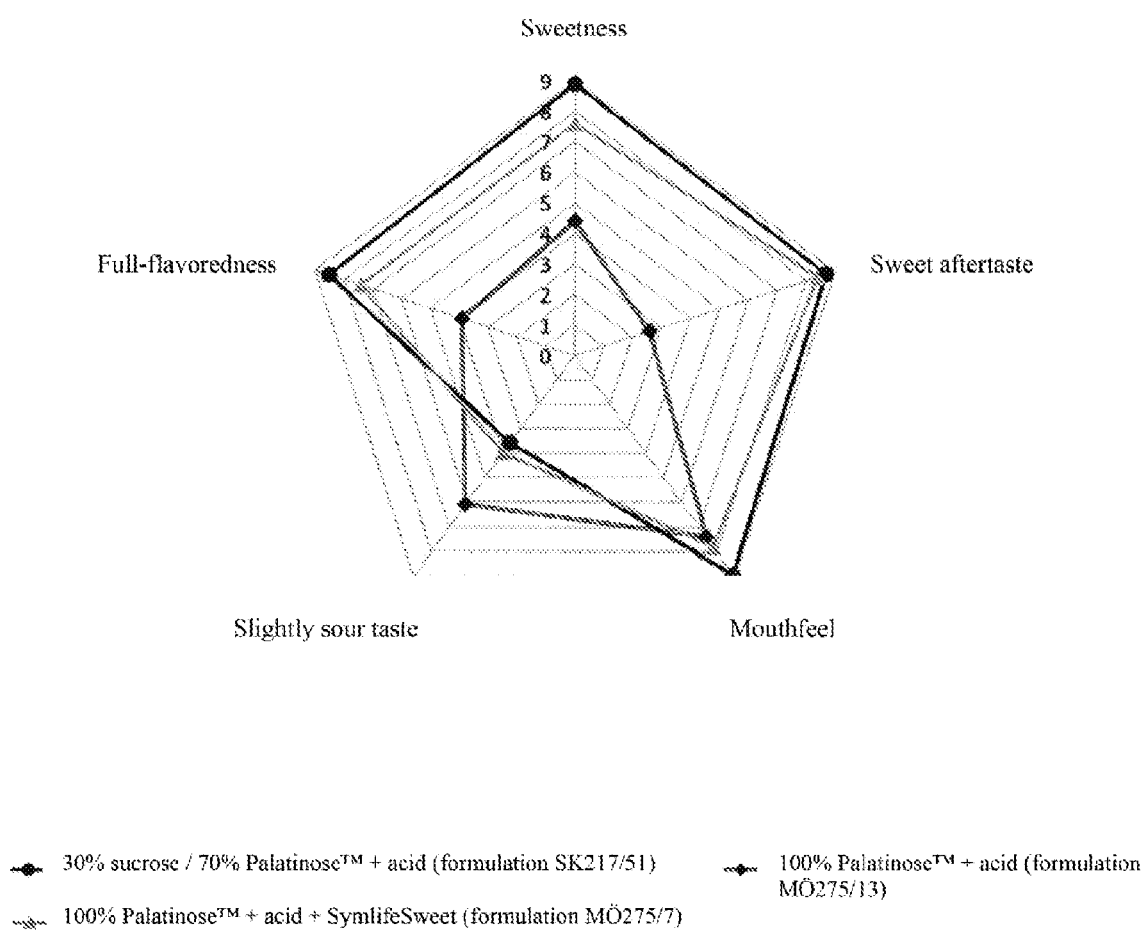

The present invention is further illustrated in the examples that follow and in FIGS. 1 and 2.

FIGS. 1 and 2 use a graphic to illustrate the sensory effects of the glazes according to the invention.

EXAMPLE 1

Raw Materials and Utensils

Palatinose™ (isomaltulose) PST-N (crystallinity: 90%<0.7 mm); Palatinose™ PST-PA (particles: 90%<50 µm); trehalose, from Hayashibara; Saccharose RF (sucrose), from SÜDZUCKER; glucose syrup DE40, from Agrana; and agar-agar thickener, from Egesie; SymLife® Sweet 362224, from Symrise Laboratory balance, hot plate, 2-liter saucepan, whisk, 3×beakers, Hobart food processor with planetary mixer and 3-liter mixing bowl, spoon, thermometer, water bath, dough scraper, 1 kg sample cans.

Formulations:

Listed in Table 1 below are inventive and non-inventive fondant formulations (denoted as "Test") that were processed into fondants according to the preparation instructions below (see also Table 2). Non-inventive formulations are in particular those that comprise exclusively sucrose as the crystalline sugar, that comprise no sweetness enhancer or no isomaltulose.

Preparation:
1) Preparation of the aqueous phase in the 2-liter saucepan
(a) Add water, glucose syrup (DS of the glucose syrup: 80%, DE 38-42) and optionally the thickener, for example agar-agar, into the saucepan and heat to 95° C. on the hotplate (time: 3 to 5 minutes).
(b) The temperature of 95° C. in the batch is held for 5 minutes to ensure that the thickener agar is completely dissolved.
(c) Water is added to compensate for water loss.
(d) Then, the amount of crystalline sugar (depending on the specified formulation, either sucrose, Palatinose™ and/or trehalose) specified in Table 1 is weighed out and added into the saucepan for forming the crystalline phase. The temperature of the batch drops from 95° C. to approximately 50° C. in the process.
(e) The mass is heated to 90° C. to 95° C. while being constantly stirred in order to completely dissolve the sugar (time: 3 to 5 minutes). The water loss is corrected once more. The sugar is visually dissolved at >75° C.
(f) The hot solution is transferred to the 3-liter Hobart bowl. In a water bath (water temperature approximately 15° C.), the temperature of the supersaturated solution is lowered to approximately 50° C. while being stirred (time: 3 to 5 minutes) and a level teaspoon of Palatinose™, PST-PA is added in order to start the crystallization. Following the crystallization, the sweetness enhancer is mixed in according to the specified formulation.
(g) After 15 minutes of stirring a cloudy suspension appears. The mass is poured into a 1 kg sample can and is allowed to rest overnight to mature at room temperature. During this time, a post-crystallization takes place. The mass becomes more firm.

TABLE 1

Formulations
Development of glazes from Palatinose

| Formulation | SK217/51 TEST | MÖ275/1 TEST | MÖ275/2 TEST | MÖ275/3 TEST | MÖ275/4 TEST | MÖ275/5 TEST | MÖ275/6 TEST |
|---|---|---|---|---|---|---|---|
| Formulation base | Fondant S20 | Fondant S20 | Fondant S20 | Fondant S20 | Fondant S33 | Fondant S33 | Fondant S33 |
| Sucrose | 230 g | 0 g | 0 g | 0 g | 0 g | 708 g | 0 g |
| Palatinose ™ | 537 g | 767 g | 767 g | 767 g | 708 g | 0 g | 0 g |
| Trehalose | 0 g | 0 g | 0 g | 0 g | 0 g | 0 g | 708 g |
| Glucose syrup | 154 | 154 g | 154 g | 154 g | 234 g | 234 g | 234 g |
| Thickener agar | 0 g | 0 g | 0 g | 0 g | 0 g | 0 g | 0 g |
| Citric acid | 0.6 g | 0 g | 0 g | 0 g | 0 g | 0 g | 0 g |
| Potassium sorbate | 0 g | 0 g | 0 g | 0 g | 0 g | 0 g | 0 g |
| Symlife Sweet 362224 | 0 g | 0 g | 0 g | 0 g | 0 g | 0 g | 0 g |
| Water | 349 g | 349 g | 449 g | 486 g | 433 g | 433 g | 433 g |
| Total | 1,270.6 | 1,270 | 1,370 | 1,407 | 1,375 | 1,375 | 1,375 |
| Dry substance (calculated) | 70% | 70% | 65% | 60% | 70% | 70% | 70% |

| Formulation | MÖ275/7 Invention | MÖ275/8 Invention | MÖ275/11 TEST | MÖ275/12 Invention | MÖ275/13 TEST | MÖ275/14 Invention |
|---|---|---|---|---|---|---|
| Formulation base | Fondant S20 | Fondant S20 | Fondant S20 | Fondant S20 | Fondant S20 | Fondant S20 |
| Sucrose | 0 g | 0 g | 0 g | 0 g | 0 g | 0 g |
| Palatinose ™ | 783.2 g | 610.6 g | 0 g | 381.6 g | 767 g | 767 g |
| Trehalose | 0 g | 152.6 g | 763.2 g | 381.6 g | 0 g | 0 g |
| Glucose syrup | 154 g | 154 g | 154 g | 154 g | 154 g | 154 g |
| Thickener agar | 0.6 g | 0.6 g | 0.6 g | 0.6 g | 0.6 g | 0.6 g |
| Citric acid | 0.6 g | 0.6 g | 0 g | 0.6 g | 0.6 g | 0 g |
| Potassium sorbate | 0 g | 0 g | 0 g | 0 g | 0 g | 0 g |
| Symlife Sweet 362224 | 2.6 g | 2.6 g | 0 g | 2.6 g | 0 g | 2.6 g |
| Water | 349 g | 349 g | 349 g | 349 g | 349 g | 349 g |
| Total | 1,270.0 | 1,270.0 | 1,266.8 | 1,270.0 | 1,271.2 | 1,273.2 |
| Dry substance (calculated) | 70% | 70% | 70% | 70% | 70% | 70% |

TABLE 2

Preparation of glazes
Test protocols of the glaze preparation

| Formulation | SK217/51 TEST | MÖ275/1 TEST | MÖ275/2 TEST | MÖ275/3 TEST | MÖ275/4 TEST | MÖ275/5 TEST | MO275/6 TEST |
|---|---|---|---|---|---|---|---|
| Formulation base | Fondant S20 | Fondant S20 | Fondant S20 | Fondant S20 | Fondant S33 | Fondant S33 | Fondant S33 |
| Quantity weighed into saucepan | 503 g | 503 g | 603 g | | 667 g | | |
| Time heating to 95° C. | 3 to 6 min | 3 to 6 min | 3 to 6 min | | 3 to 6 min | | |
| Temp. after heating | approx. 95 | approx. 95 | 96.7 | | approx. 95 | | |
| Holding time at 95° C. | 5 min | 5 min | 5 min | | 5 min | | |
| Weight after cooking | 451 g | 445 g | 547 g | | 597 g | | |
| Correction with water | 52 g | 58 g | 56 g | | 70 g | | |
| Addition of sugar | 230 g sucrose/537 g Palatinose | 767 g | 767 g | | 708 g | | |
| Temperature after addition of sugar | 50 to 52° C. | 50 to 52° C. | 50 to 52° C. | | 50 to 52° C. | | |
| Time heating to approx. 90 to 95° C. | 3 to 4 min | 3 to 4 min | 3 to 4 min | | 3 to 4 min | | |
| Temperature after heating | approx. 95° C. | approx. 95° C. | approx. 95° C. | No crystallization possible | approx. 95° C. | No cooking processes were carried out because of the poor crystallization | |
| Weight after heating | 1255 g | 1260 g | 1357 g | | 1368 g | | |
| Correction with water | 15 g # | 10 g | 13 g | | 7 g | | |
| Quantity weighed into Hobart | 1250 g | 1250 g | 1350 | | 1351 | | |
| Temp. cooling water | 0.2° C. (ice water) | 0.2° C. (ice water) | 0.2° C. (ice water) | | 0.2° C. (ice water) | | |
| Cooling time to approx. 50° C. | 3 min | 3 min | 3 min | | 2 min | | |
| Cooling temp. | approx. 49° C. | approx. 50° C. | approx. 49° C. | | approx. 52° C. | | |
| Crystall. time in Hobart | terminated after 15 min | terminated after 15 min | terminated after 15 min | | terminated after 45 min | | |
| Texture | glaze-like | glaze-like | glaze-like | | glaze-like | | |
| Crystal size (mouthfeel) | relatively fine | relatively fine | relatively fine | | relatively fine | | |
| Filling into | 1 kg can | 1 kg can | 1 kg can | | 1 kg can | | |

| Formulation | MÖ275/7 Invention | MÖ275/8 Invention | MÖ275/11 TEST | MÖ275/12 Invention | MÖ275/13 TEST | MÖ275/14 Invention |
|---|---|---|---|---|---|---|
| Formulation base | Fondant S20 | Fondant S20 | Fondant S20 | Fondant S20 | Fondant S20 | Fondant S20 |
| Quantity weighed into saucepan | 503 g | 503 g | 503 g | 503 g | 503 g | 503 g |
| Time heating to 95° C. | 3 to 6 min | 5 min 33 sec | 3 min 20 sec | 3 min 15 sec | approx. 3 min | 3 to 5 min |
| Temp. after heating | 95.1° C. | 95.5° C. | 95.2° C. | 95.4° C. | 95.5° C. | 95.1° C. |
| Holding time at 95° C. | 5 min | 5 min | 5 min | 5 min | 5 min | 5 min |
| Weight after cooking | 447 g | 445 g | 445 g | 447 g | 450 | 443 |
| Correction with water | 56 g | 58 g | 58 g | 56 g | 53 g | 60 g |
| Addition of sugar | 763 g | 152 g trehalose/ 611 g Palatinose | 763 g | 381.6 g trehalose/ 381.6 g Palatinose | 767 g | 767 g |
| Temperature after addition of sugar | 50 to 52° C. | 48° C. to 52° C. | 43° C. | 47° C. | 50 to 52° C. | 50 to 52° C. |
| Time heating to approx. 90 to 95° C. | approx. 3 min | 4 min 30 sec | approx. 3 min | approx. 3 min | 3 to 4 min | 3 to 4 min |
| Temperature after heating | no data | 95.5° C. | 96.1° C. | 95.6° C. | approx. 95° C. | approx. 95° C. |
| Weight after heating | 1256 g | 1253 g | 1256 g | 1260 g | 1259 g | 1259 g |
| Correction with water | 14 g | 17 g | 11 g | 10 g | 15 g | 14 g |
| Quantity weighed into Hobart | 1250 g | 1250 g | 1250 g | 1250 g | 1250 g | 1250 g |
| Temp. cooling water | 16° C. | 16 to 20° C. | 15.1° C. | 15.2° C. | approx. 15° C. | approx. 15° C. |
| Cooling time to approx. 50° C. | 4 min 20 sec | 3 min 50 sec | 4 min 03 sec | 3 min 35 sec | approx. 3 min | approx. 3 min |
| Cooling temp. | 52° C. | 50.5° C. | 51° C. | 46.5° C. | 50.5° C. | 51° C. |
| Crystall. time in Hobart | terminated after 15 min/39° C. | terminated after 15 min/37° C. | terminated after 10 min | terminated after 15 min | terminated after 15 min | terminated after 15 min |
| Texture | glaze-like | glaze-like | glaze-like | glaze-like | glaze-like | glaze-like |
| Crystal size (mouthfeel) | sandy | finer than pure Palatinose | very coarse | coarse | relatively fine | relatively fine |
| Filling into | 1 kg can | 1 kg can | 1 kg can | 1 kg can | 1 kg can | 1 kg can |

Practical Experiments:

The glazes are processed at 40° C. to 50° C. on hot doughnuts (approximately 75° C.), which are then stored at room temperature for 8 days.

Results:

The tests performed and the results obtained show that the applied fondants according to the invention, i.e., the product glaze, dried within a few seconds and a clear and transparent glaze was formed in an advantageous manner. The stability of the glaze is very good and is still present even after eight days of storage, the glaze being transparent in an advantageous manner even after this long storage time. Post-crystallization of the glaze components occurs only to a limited extent; the use of trehalose advantageously does not cause any post-crystallization in the glaze, in particular none that is present in addition to a potentially present, but then only slight, post-crystallization induced by isomaltulose. In an especially preferred embodiment it is shown that a combination of the sugars trehalose and isomaltulose reduces the effect of a post-crystallization, such as it occurs in the coating made of 100% isomaltulose. Moreover, especially good processability of the fondant is achieved, in particular through the use of isomaltulose. The isomaltulose crystallizes finely in the process described above, is easy to process and the flowability is not reduced. The use of trehalose is particularly advantageous in that a maturation period of the glaze is not necessary or is shortened.

FIG. 1 shows the result of a taste experiment. The formulation according to the invention MÖ275/14 was compared with the control 275/1. The use of the fondant formulation according to the invention results in a significantly improved flavor profile, namely a considerably improved sweetness perception, an improved full-flavoredness, a clearly sweeter aftertaste and additionally an improved fruitiness and stronger caramel-flavor perception.

FIG. 2 uses a graphic to illustrate the results of a further taste experiment. In this experiment, the fondant formulation MÖ275/7 according to the invention was compared with the controls MÖ275/13 and SK217/51. It becomes apparent that the formulation MÖ275/7 according to the invention triggers a significantly more full-flavored, sweeter flavor perception as compared to the control formulation 275/13 and also leads to a significantly sweeter aftertaste and an improved mouthfeel. In all of these parameters, the fondant formulation according to the invention is equal to that achieved by means of a sucrose-containing formulation.

The invention claimed is:

1. A fondant comprising 0.1 to 1.0% by weight of at least one sweetness enhancer based on the dry substance of the fondant and a sugar system comprised of a crystalline phase and a non-crystalline phase, wherein said fondant comprises 65 to 95% by weight of at least one sugar in the form of a crystalline phase based on the dry substance of the fondant and 4 to 34% by weight of glucose syrup in the form of a non-crystalline phase based on the dry substance of the fondant, wherein the crystalline phase consists of isomaltulose, or consists of a mixture of isomaltulose and trehalose comprising 40-99% by weight of isomaltulose and 60 to 1% by weight of trehalose or consists of a mixture of isomaltulose, trehalose and sucrose comprising 40 to 99% by weight of isomaltulose and 60 to 1% by weight of trehalose, in each case based on the total weight of the crystalline phase.

2. The fondant according to claim 1, wherein the particle size of the isomaltulose in the crystalline phase is 90% less than 50 μm.

3. The fondant according to claim 1, wherein the sweetness enhancer is a plant extract.

4. The fondant according to claim 1, wherein the fondant contains 0.9 to 40% by weight of water based on the total weight of the fondant.

5. The fondant according to claim 1, wherein the fondant contains 0.01 to 0.3% by weight of thickener, based on the dry substance of the fondant, selected from the group consisting of agar, carrageenan and xanthan gum.

6. The fondant according to claim 1, wherein the fondant contains 0.01 to 3% by weight of a food-grade organic acid, a flavor or both, based on the dry substance of the fondant.

7. The fondant according to claim 6, wherein the food-grade organic acid is citric acid or lactobionic acid.

8. The fondant of claim 1, wherein the fondant is a food product coating.

9. The fondant of claim 8, wherein the fondant is in semi-solid or liquid form and has a water content of 7 to 40%.

10. The fondant of claim 8, wherein the fondant is a finished, dried coating and has a water content of 0.3 to 0.5%.

11. The fondant of claim 8, wherein; the food product is a baked good selected from the group consisting of a deep-fried pastry, a cake, a torte, a cookie, a waffle, a confectionery product, a patisserie product or the like.

12. A food product that is completely or partially coated with a fondant according to claim 1.

13. The food product according to claim 12, wherein the fondant is transparent.

14. A sweet containing a fondant according to claim 1 as a filling.

15. A method for preparing a fondant, wherein the fondant contains 0.1 to 1.0% by weight of at least one sweetness enhancer based on the dry substance of the fondant and a sugar system comprised of a crystalline phase and a non-crystalline phase, wherein said fondant comprises 65 to 95% by weight of at least one sugar in the form of a crystalline phase based on the dry substance of the fondant and 4 to 34% by weight of glucose syrup in the form of a non-crystalline phase based on the dry substance of the fondant, wherein the crystalline phase consists of isomaltulose, or consists of a mixture of isomaltulose and trehalose comprising 40-99% by weight of isomaltulose and 60 to 1% by weight of trehalose or consists of a mixture of isomaltulose, trehalose and sucrose comprising 40 to 99% by weight of isomaltulose and 60 to 1% by weight of trehalose, in each case based on the total weight of the crystalline phase, wherein the method comprises: (a) mixing the crystalline isomaltulose with the non-crystalline phase containing glucose syrup and water, (b) adding isomaltulose seed crystals to the mixture obtained in step (a), and (c) adding the at least one sweetness enhancer to the mixture obtained in step (b), whereby a fondant is obtained.

16. The method according to claim 15, wherein in step (a) crystalline isomaltulose and crystalline trehalose are mixed with the non-crystalline phase.

17. The method according to claim 15, wherein in step (a) the crystalline isomaltulose and the optionally present crystalline trehalose are completely dissolved in the non-crystalline phase while being heated.

* * * * *